US012697275B2

(12) United States Patent
Collins et al.

(10) Patent No.: US 12,697,275 B2
(45) Date of Patent: Aug. 4, 2026

(54) MODULAR FRAMING SYSTEM FOR SPAS, HOT TUBS, AND OTHER LARGE WATER CONTAINMENT VESSELS

(71) Applicant: May Manufacturing, LLC, Las Vegas, NV (US)

(72) Inventors: Samuel Collins, Dallas, OR (US); Scott Backer, Albany, OR (US); Eber Chacon, Las Vegas, NV (US); Eric Hales, Las Vegas, NV (US)

(73) Assignee: May Manufacturing, LLC, Las Vegas, NV (US)

( * ) Notice: Subject to any disclaimer, the term of this patent is extended or adjusted under 35 U.S.C. 154(b) by 163 days.

(21) Appl. No.: 18/817,668

(22) Filed: Aug. 28, 2024

(65) Prior Publication Data

US 2025/0073121 A1 Mar. 6, 2025

Related U.S. Application Data

(60) Provisional application No. 63/535,414, filed on Aug. 30, 2023.

(51) Int. Cl.
*A61H 33/00* (2006.01)

(52) U.S. Cl.
CPC ................................ *A61H 33/6005* (2013.01)

(58) Field of Classification Search
CPC .... A61H 33/6005; E04H 4/0093; E04H 4/005
See application file for complete search history.

(56) References Cited

U.S. PATENT DOCUMENTS

| | | | | |
|---|---|---|---|---|
| 7,802,324 | B2 * | 9/2010 | Layfield | A47K 3/00 4/584 |
| 9,572,459 | B2 | 2/2017 | Dragovic et al. | |
| 9,713,571 | B2 | 7/2017 | Mclane et al. | |
| 11,447,969 | B2 | 9/2022 | Tulett et al. | |
| 11,702,854 | B2 | 7/2023 | Foy et al. | |
| 2009/0260150 | A1 * | 10/2009 | Dragovich | A47K 3/161 4/584 |
| 2011/0252680 | A1 * | 10/2011 | Pitcher | A47G 1/06 40/765 |
| 2015/0196167 | A1 * | 7/2015 | Dragovic | A61H 33/6005 4/584 |
| 2021/0095488 | A1 * | 4/2021 | Tulett | A61H 33/6005 |

* cited by examiner

*Primary Examiner* — Christine J Skubinna
(74) *Attorney, Agent, or Firm* — McDonald Hopkins LLC

(57) ABSTRACT

A modular frame and system for supporting a swim spa, hot tub, or other water containment vessel is contemplated. The system includes a plurality of keyed vertical members attachable to cooperating grooves in horizontal rails. The ends of the horizontal rails attach via keyed projections to a corner bracket, while a retaining member secures to a groove in horizontal rail to secure an integrated protective bottom sheet. All of these components can be manufactured in standardized dimensions relying upon low-cost, light-weight polymeric materials. Methods and systems for using these components in a variety of customizable arrangements are also contemplated.

18 Claims, 8 Drawing Sheets

MODULAR FRAMING SYSTEM FOR SPAS, HOT TUBS, AND OTHER LARGE WATER CONTAINMENT VESSELS

CROSS REFERENCE TO RELATED APPLICATIONS AND TECHNICAL FIELD

This application claims priority to U.S. provisional patent application Ser. No. 63/535,414 filed on Aug. 30, 2023, which is incorporated by reference herein.

The invention relates to a modular construction system useful for swim spas, hot tubs and the like and, more specifically, to apparatus and methods involving keyed vertical and horizontal framing members in combination with corner connectors in order to construct lightweight, polymeric, and infinitely configurable frames without the need for large prefabricated elements or specialized tooling.

BACKGROUND

As the popularity of hot tubs, swim spas, and other similar implements has grown over the years, so too has the need for support and containment structures capable of accommodating these vessels. Insofar as these vessels contain hundreds or thousands of gallons of water, these structures must be sufficiently strong yet capable of accommodating a variety of different plumbing, lighting, and electrical configurations. For example, hot tubs may have pumps, piping, or other components that need to be accessible during installation but should be concealed by decorative elements after the manufacturing and installation is complete. The materials and assembly of components must also be capable of withstanding exposure to moisture and/or elevated temperatures for prolonged periods of time.

Additionally, these systems are often installed in private homes and/or comparatively secluded areas. In such instances, it may not be feasible to rely on a monolithic support. Instead, a modular framing systems relying on light-weight, cost-effective materials would be preferred.

Further still, manufacturers may offer a multiplicity of different tubs having differing dimensions. In other instances, installation and repair companies may have a need to rely on framing solutions to accommodate a variety of different scenarios. As such, a support and containment system that could be easily adapted to accommodate a range of different dimensions (length, width, and depth) with minimal would be welcomed.

U.S. Pat. No. 7,802,324 describes a modular, prefabricated spa. A unitary support member is integrally molded into the rim of a monolithic spa tub itself, while support struts attach to a channel in the rim. Exterior sidewall panels are installed along an outer facing to conceal the support struts, as well as the tub itself.

U.S. Pat. No. 9,572,459 discloses a portable spa construction. Here, trapezoidal-shaped side panels are stacked and mounted within cooperating grooves, with tapered corner pieces helping to constrain the side panels. This construction is specifically provided to accommodate thermal expansion and contraction of its constituent parts.

U.S. Pat. No. 9,713,571 illustrates a spa cabinet construction system in which horizontal panels mount with a clip strip that snaps into vertical members. A specialized corner profile piece is associated with a vertical clip strip to position the vertical members for attachment to the horizontal members at each corner of the spa cabinet.

U.S. Pat. No. 11,447,969 contemplates a spa support structure with vertical supports, channel brackets that mate to those supports. Exterior brackets are positioned on the channel brackets to allow for attachment of exterior panels. This system relies on grooved connections in a separate attachment piece to connect to the vertical supports.

U.S. Pat. No. 11,702,854 describes a decorative spa structure that is fitted around a "rotomolded" unibody shell defining the spa basin. In particular, a frame having side beams, shafts, and couplers can be installed into a cavity defined by the peripheral wall and upper edge of that basin. The couplers may include slots to receive the beams and pegs to engage the shafts.

All of the foregoing documents are incorporated by reference for providing additional background on the state of the art and the needs within this field. Further, in view of these documents and the observations above, a lightweight framing system manufactured from low cost materials and methods would be welcome. Similarly, a system and frame, as well as a method of assembling the same, that relied upon a discrete and comparatively small number of standardized and interchangeable components would enable modular system that is capable of being configured in a multiplicity of dimensions and shapes. Lastly, a modular system that did not require specially formed features on the spa basin would lend even greater flexibility for the adoption and use of that system.

DESCRIPTION OF THE DRAWINGS

Operation of the invention may be better understood by reference to the detailed description taken in connection with the following illustrations. These appended drawings form part of this specification, and any information on/in the drawings is both literally encompassed (i.e., the actual stated values) and relatively encompassed (e.g., ratios for respective dimensions of parts). In the same manner, the relative positioning and relationship of the components as shown in these drawings, as well as their function, shape, dimensions, and appearance, may all further inform certain aspects of the invention as if fully rewritten herein. Unless otherwise stated, all dimensions in the drawings are with reference to inches, and any printed information on/in the drawings form part of this written disclosure.

In the drawings and attachments, all of which are incorporated as part of this disclosure:

FIG. 1A is a perspective view of a modular frame according to certain disclosed aspects, including a plurality of vertical members coupled to a plurality of horizontal rails which, in turn, are coupled to a plurality of corner brackets with an integrated protective bottom sheet, while

DESCRIPTION OF THE SELECTED EMBODIMENTS

Figure 1A:
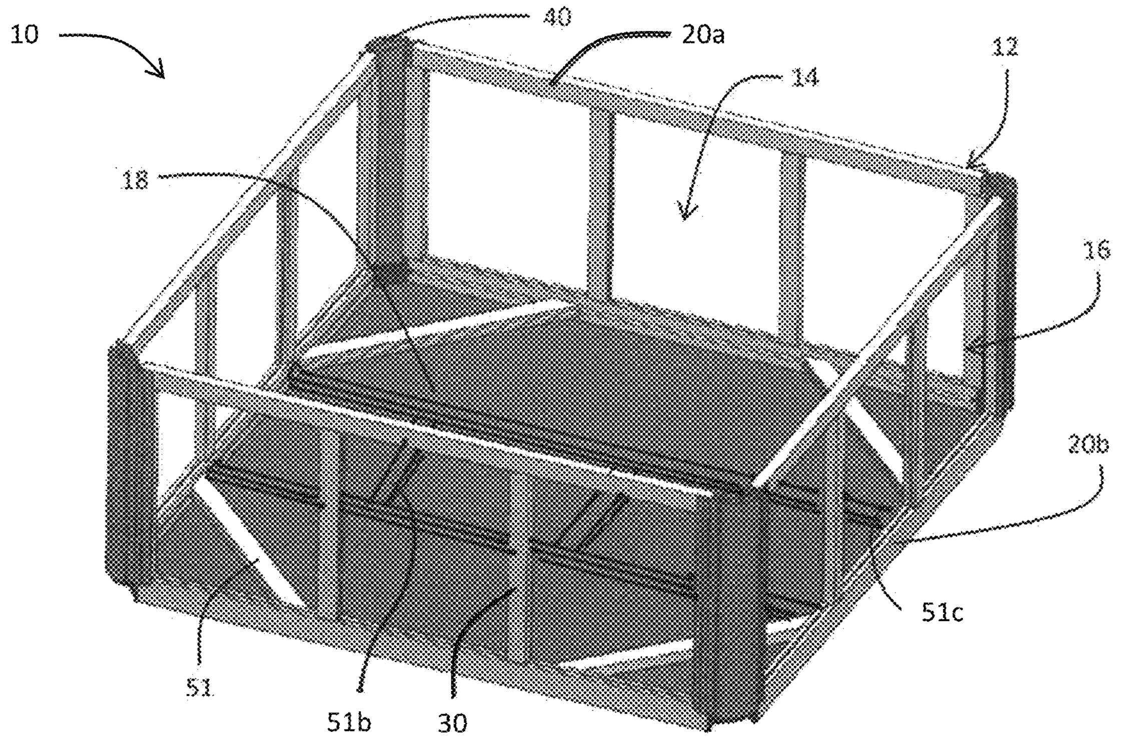
Figure 1B:
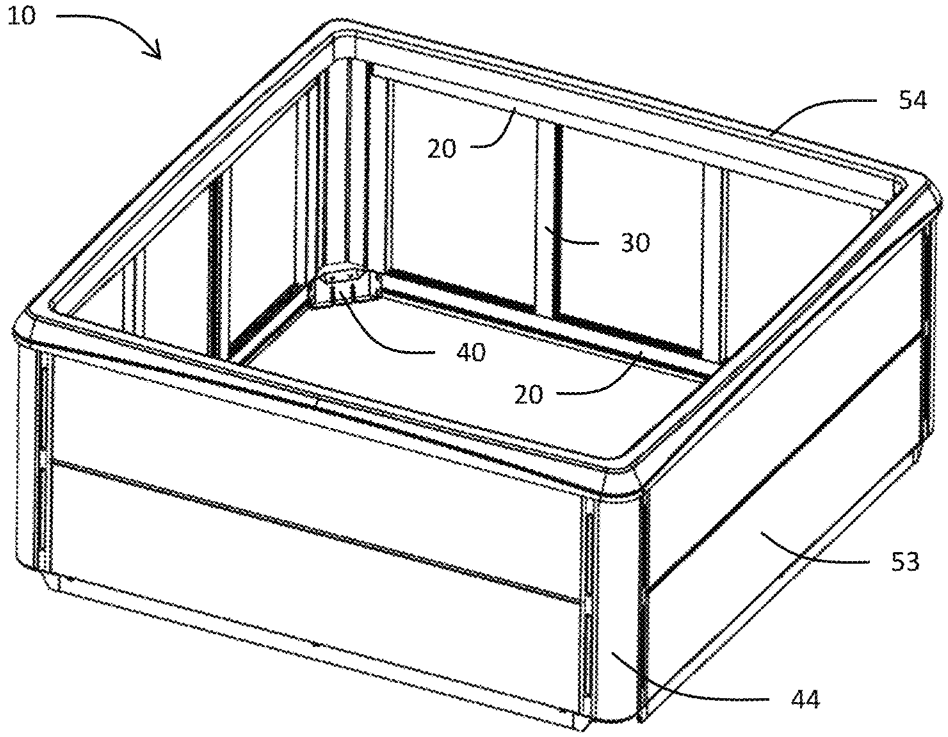
FIG. 1B is a complimentary perspective view with the modular frame fitted to include various other decorative or structural elements.

Operation of the invention may be better understood by reference to the detailed description, drawings, claims, and abstract-all of which form part of this written disclosure. While specific aspects and embodiments are contemplated, it will be understood that persons of skill in this field will be able to adapt and/or substitute certain teachings without departing from the underlying invention. Consequently, this disclosure should not be read as unduly limiting the invention(s).

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Insofar as the system and/or selected components described herein may possess a an elongate shape in the form of a polygonal cylinder (e.g., a solid rod with a rectangular profile), it will be understood that the terms length, axis, and axial may be used synonymously, while transverse, radial, and diameter all refer to lines and spatial planes that are perpendicular to the length. Otherwise, reference to vertical and horizontal will be understood based upon the images as they are oriented (in portrait-configuration) in the attached drawings.

Also, unless otherwise stated, measurements and observations were taken under normal, ambient conditions (e.g., temperature, pressure, etc.), and any molecular weights are weight averages while formulations can be presumed as weight percentages (if/when appropriate). Still other terminology, conditions, and measurement techniques/methodologies will be readily apparent to those skilled in this art based upon industry norms, and this disclosure should be interpreted accordingly. All individual images in the drawings are drawn to scale, and a skilled person will appreciate that the comparative dimensions, positioning, and arrangement of the components shown in that individual image are embraced as part of this disclosure, irrespective of the level of detailed description provided herein.

With reference to FIGS. 1-10C, the various aspects of the inventive system 10 include several standardized elements. The use of standardized elements provides greater flexibility in providing modular kits that are easily adapted to accommodate containers of various dimensions with only minimal alterations to the system 10 components. Further, these components can be made from injection molded polymers to minimize costs.

As seen in FIG. 1A, the system 10 is assembled into a frame 12 that defines a cavity 14 capable of receiving and supporting the basin and perimeter flange for a hot tub, swim spa, or other similar fluid containment vessel. Insofar as hot tubs and swim spas require sufficient structural support when filled while simultaneously needing comparatively easy access to position, install, and access plumbing and electrical lines, the openings in the sidewalls 16 (defined by the space between the vertical supports 30 and/or the corner brackets 40) are particularly useful. Additionally, and as will be described in greater detail below, the coupling connections formed on the horizontal rails 20 channels in which plumbing or electrical lines can be disposed, as do the potentially hollow interstices of the corner brackets 40. In some aspects, a concealing cap assembly 44 is positioned vertically in the corners between, above, and/or below each bracket.

Struts 51 can be laid in the corners to facilitate positioning of the rails at proper/desired angles and to provide lateral stability, with the ends of the strut cut at appropriate angles to conform to the shape of the frame 12. Additionally, or alternatively, one or more struts 51*c* may be used in parallel or perpendicular to rails 21 and stabilized independently by struts 51*b* so as to accommodate and support various sizes and shapes of basins. In some aspects, top and/or bottom horizontal rails 20 could be used as struts 51*c* and/or vertical supports 30 might be of appropriate size to serve as struts 51*b*. In other aspects, the struts 51*b* and/or 51*c* can be formed and sized independently of the rails 20 and supports 30, and it may not always be necessary to employ struts 51*b*.

Panels 53 be attached to the bracket 40 and/or concealing assembly 44 (when used). Such panels 53 can be stacked vertically as a plurality of segments, or a single element can form the entirety of the visible outer sidewall. A concealing lip 54 can be provided over the top of the top rails 20*a* to provide a decorative and/or protective finish. The lip 54 can be installed before or after the tub (not shown) is seated in the cavity 14.

Further, the system 10 may be provided with an optional protective floor 18. Floor 18 can prevent stones, moisture, rodents or other unwanted objects from directly contacting the underside of the basin, while also potentially providing rigidity and support. Struts 51, 51*b*, 51*c* can also serve to restrain the floor 18 in its proper/desired positioning.

The system 10 also lends itself to simplified methods of assembly. In particular, owing to the keyed joints between the main components (i.e., horizontal rails 20, vertical supports 30, and corner brackets 40, including the concealing cap 44 in certain aspects), the frame 12 can be assembled without the need for tools or specialized implements. Similarly, the modular nature of these components allows for substitution of different sizes for selected elements (e.g., rails 20 of different length could be provided and used, kits could be created to possess a plurality of differently sized options so as to simplify manufacturing alterations that sometimes arise, etc.). Finally, the intuitive nature of the couplings allows comparatively unskilled workers to assemble the frame 12.

In one aspect, the system 10 will result in construction of a polygonal cube-shaped frame and, more specifically, a square or rectangular shaped cube with four top rails, four bottom rails, four corner brackets forming right angles, and at least four to eight vertical supports, although a larger number of vertical supports will be capable of accommodating larger loads. Preferably, at least two, three or four vertical supports are used in each sidewall of the frame 12. In some aspects, the top and bottom rails can be identical, or a simplified top rail can be employed (as described below).

In other aspects, the corner brackets can be formed at other cooperating angles, while still relying upon standardized rails and supports. For example, corner brackets formed at 120° or 135° angles allow for the creation of hexagonal or octagonal shapes, respectively speaking, that might be able to accommodate polygonal, oval, circular, or other similarly shaped tubs. It would also be possible to differently angled corner brackets within the same kit/system so as to produce still other polygonal or curving shaped tubs.

In some aspects, the bracket 40 may be formed as continuous, elongate cylinder extending partially or completely up the height of the frame 12 (i.e., in the axial direction, parallel with the vertical rails). A decorative concealing cap 44 can be employed in addition to or in place of an elongate bracket 40. Minimizing the size of the bracket 40 can be advantageous from a materials usage perspective, insofar as the concealing cap 44 may not require the strength and rigidity of the bracket 40. Various configurations of the cap 44 are possible, as comparatively illustrated by the embodiments FIG. 5 and FIGS. 10A-10C. In some aspects, use of a cap bracket-enforced concealing cap, similar to those contemplated in FIGS. 8A-10C, can limit the need for brackets like those in FIGS. 3A and 7B, to the bottom corners of the frame 12 (i.e., no brackets needed at the top rail).

With specific reference to FIGS. 2-7B, top horizontal rail 20*a* consists of an elongate rectangular cylindrical member 21, formed as a solid or hollow, enclosed tube. At least one lengthwise channel or groove 23 is disposed along its bottom edge. The bottom horizontal 20*b* also has a bottom groove 23, along with a corresponding top channel or groove 22. Grooves 22, 23 are configured to receive and couple to the keying projections 32, 33 formed on the vertical supports 30, as well as the top/bottom connecting flanges 421 on the corner bracket 40. In order to accommodate the fullest possible range of configurations and uses, the channels 22, 23 should run the entire axial length of member 21, retaining the same profile and depth and with that profile and depth selected to match and couple to the aforementioned projections 32, 33 and flanges 421. A small bead or groove could be disposed along the outer edge or inner surfaces of the grooves 22, 23 to facilitate a snap-fitting connection (provided cooperating features also at appropriate positioning on the projections 32, 33 and/or flanges 421).

In order to insure modularity, the grooves 22, 23 should be substantially identical in terms of positioning on the member 21 (i.e., preferable along the middle of the exposed surface), profile, and depth. Also, the preferred profile (i.e., the cross-sectional shape when viewed along a transverse plane of the member 21) is rectangular or square, although it is possible to employ rounded or specially shapes on the innermost facing of the grooves 22, 23.

Bottom rail 20*b* also has a midline groove 24. Midline groove 24 can be identical to grooves 22, 23, or it could possess a different profile and depth so long as it cooperates with the flange 421. Groove 24 is also capable of coupling to and/or receiving the peripheral edges of the bottom panel(s) 50 and/or keying projections formed on the ends or edges of the angled, parallel or perpendicular support and positioning struts 51, 51*b* and 51*c*.

Figure 2:
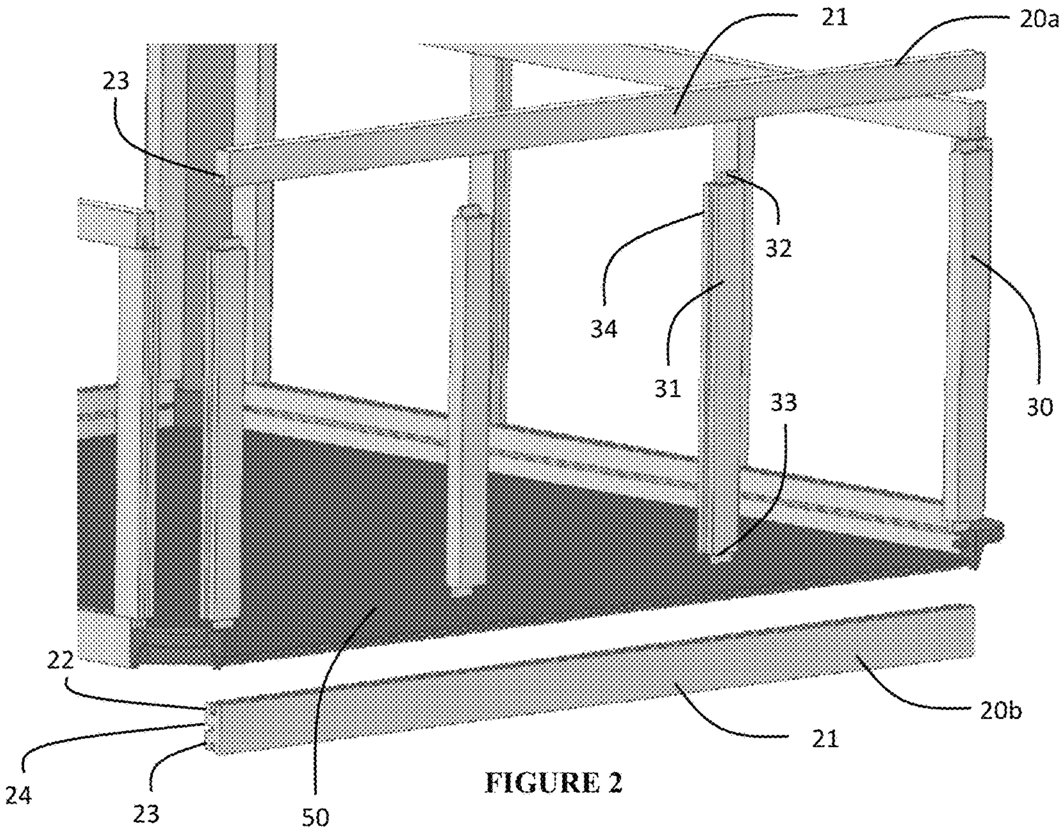
FIG. 2 is an exploded perspective view of the fitment between the vertical and horizontal rails, with the components shown in isolation as compared to FIG. 1.

While FIG. 2 shows the use of rails 20*a* and 20*b*, the system 10 can be configured so that rail 20*b* serves at both the bottom and top positions. This would reduce the number of components needed to create the system, while retaining the ability to couple to the vertical supports 20, corner brackets 40, and/or bottom panel 50 as needed.

Vertical supports 30 are also made from a solid or hollow elongate, rectangular rod formed as body 31. Supports 30 can have a substantially similar construction to rails 20, in terms of their height and width. The axial length of supports 30 may be the same as or shorter than that of the rails, with the length of supports 30 helping to define the maximum possible depth of the water containment vessel.

At the top and bottom ends of each support 30, at least one keying projection 32 and 33 (respectively) extend axially away from the member 31. The projections 32, 33 are configured to be received within and couple to the grooves 22, 23 (as noted above). Thus, the projections 32, 33 will have a regular and consistent shape that conforms to the profile of the grooves 22, 23 (as shown, a cuboid with a square or rectangular shape). Preferably, each projection 32, 33 is positioned along at least one or both midlines that bisect the facings of each end, as this positioning insures even weight distribution and should form a flush fit at the intersection of the rails 20 and supports 30 which, in turn, defining the inner and outer facings of sidewalls 16.

In one aspect, an axial channel 34 runs along part or the entire length of the member 31. Channel 34 can be used to accommodate or couple wiring and/or plumbing as may be needed by the containment vessel. Channel 34 can posses the same profile and depth as the channels 22, 23, and/or 24 to promote modularity and interchangeability. In one aspect, a vertical support having the channel 34 could be used as a horizontal rail, in which case the installer may remove, snap off, or cut off the projections 32, 33.

In order to reduce plastic usage and provide additional cavities or channels in which wires and plumbing can be seat, the rails 20 and/or supports 30 could be formed as hollow tubes. Access apertures can be formed at regular intervals along the axial length to allow for snaking and access to wires and tubes that may be fed through the hollow interstices.

As another means of wire and plumbing management, connectors and retainers having the same profile and depth as the grooves 22, 23, and/or 24 can be included in the system. These retainers may possess features similar to the panel retainer 52 described below, except that they might include loops, straps, or apertures to which wires, pipes, or attachment members (e.g., zip ties) could be threaded and/or affixed.

In another aspect, at least the rails 20 can be provided in large axial lengths, with the understanding that an assembler could custom cut the desire lengths (using any type of saw). This approach would also allow for the large axial rail to be cut with angled ends so as to serve as an angled support and positioning strut 51.

Corner bracket 40 is configured to couple to a plurality of rails 20 at desired angles, as mentioned above. Specifically, two sets of keying projections 42 formed on its two rail abutment facings 412 couple to the grooves 22, 23, and/or 24 on each adjacent rail 20. Thus, the corner bracket 40 is formed of a solid or hollow housing 41 having a shape dictated by the connecting angles. As seen in the drawing, a 90° connecting means the housing 41 can have a triangle-shaped transverse cross section, with the rail abutment facings 412 lying in imaginary vertical planes that intersect at that same angle. An inner facing 411 defines the housing 41 along the hypotenuse of the transverse cross sectional shape, while the outer facing 413 may have a more curved or bulbous shape.

When the bracket 40 is formed as a hollow tube support ribs and/or a support web 414 can be formed along portions or the entire axial length of the interior. As above, this hollow interior could conceal and contain wires or pipes, with access holes provided or created on either of both of facings 411, 413.

Significantly, keying projections 42 are formed at regular intervals and with consistent shapes and spacing on each bracket 40. Projections 42 should extend away from their respective facing 412 at a consistent, and preferably perpendicular, orientation so as to maintain modular interchangeability. At least one of the projections 42 are also preferably formed along the axial midline running down each facing 412 to insure consistent alignment and fit with the rails 20.

There should be at least two projections 42 on each facing 412. The first is referred to as the middle connecting flange 422, which is configured to couple to the groove 24. The second is referred to as the top/bottom connecting flange 421, which may be positioned below (as shown in the Figures) or above the middle flange 422. Notably, if the grooves 22, 23, and 24 all have the same profile and depth (i.e., rectangular, as shown in the figures), this means that flanges 421 and 422 with have an offset orientation relative to one another, with the top/bottom flange 421 centered along the axially midline of the facing 421 and the middle flange 422 protruding perpendicularly away from it. Notably, the two separate projections 421, 422 on the two separate facings 412 should be formed at the same elevation (i.e., the same distances away from the top and bottom edges of the facings). In some aspects, the positioning of the projections 421, 422 could impart reversibility, so that the bracket 40 could be "flipped" to create a top connecting flange for the bottom rail 20*b* and a bottom connecting flange for the top rail.

Figure 3A:
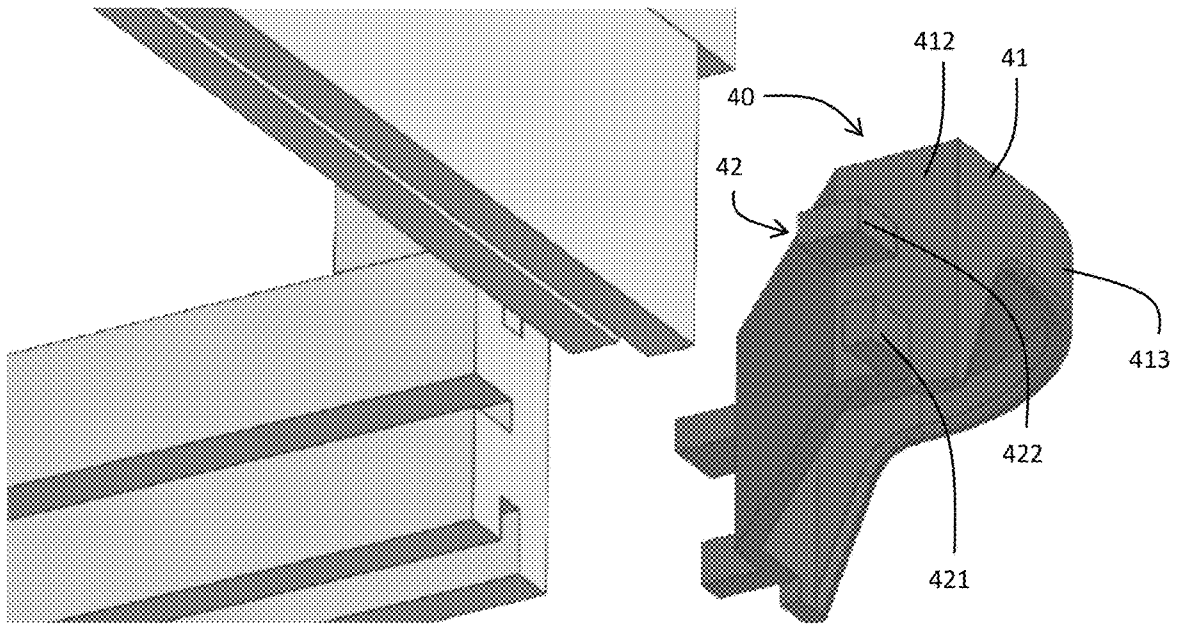
FIG. 3A is an exploded perspective view of the fitment between the horizontal rails and the corner bracket and FIG. 3B is an alternative perspective view of the coupled elements, with both view having the components shown in isolation as compared to FIG. 1.
Figure 3B:
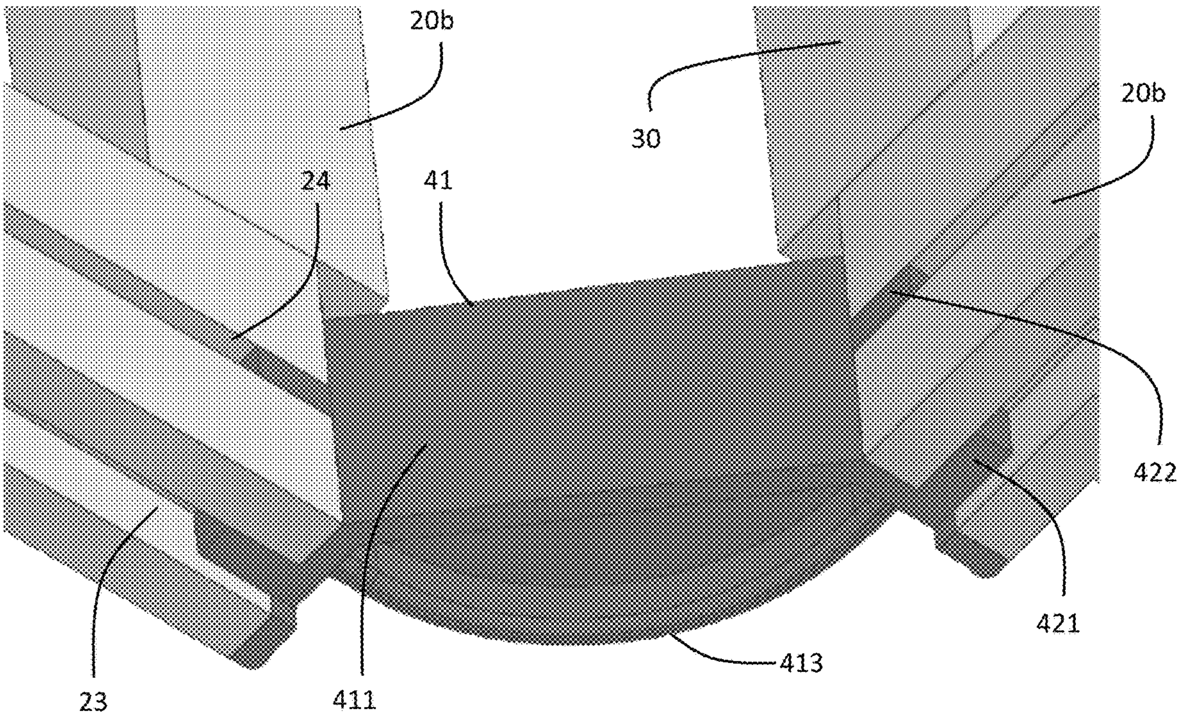
Figure 4:
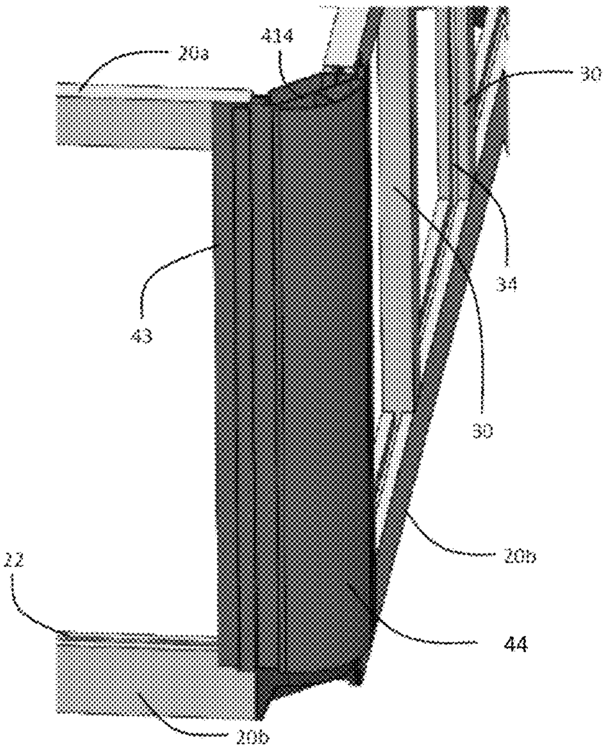
FIG. 4 is a sectional view of an alternative corner bracket, as compared to FIG. 3A, in which the alternative corner bracket extends vertically between the top and bottom sets of horizontal rails.

While the housing in FIGS. 3A and 3B is shown in a compact axial state capable of accommodating only one set of rail connections on each facing 412, another aspect involves a housing 41 extends axially up to the length as the vertical supports 30 and the added distance imparted/required by portion needed to connect to the top and bottom rails. As seen in FIG. 4, it is also possible to use a combination of a compact corner 40 (FIG. 3A, 3B) and an elongated corner (FIG. 4).

When an elongated corner bracket 40 is provided (i.e., the bracket 40 extends axially upward, possibly connecting with top rails 20*a* to impart vertical load-bearing), a series of evenly spaced projections 421, 422 can be formed along part or all of the axial length of the facing. This arrangement would provide the assembler with options as to the height of the frame/depth of the basin. It also provides for the possibility of transversely cutting the elongate housing to a desired height (if a series of projections 421, 422 are provided, such a cut should be made between the sets and not between two cooperating flanges 421 and 422 themselves). In this aspect, the elongate housing provides an ideal conduit for wires and tubing and, to the extent a top connecting flange is employed at the interface with the bottom rail 20*b*, the bottom channel 23 on that bottom rail 20*b* would be exposed so as to allow for a transition for concealing horizontal and vertically running wires and/or tubing.

Figure 5:
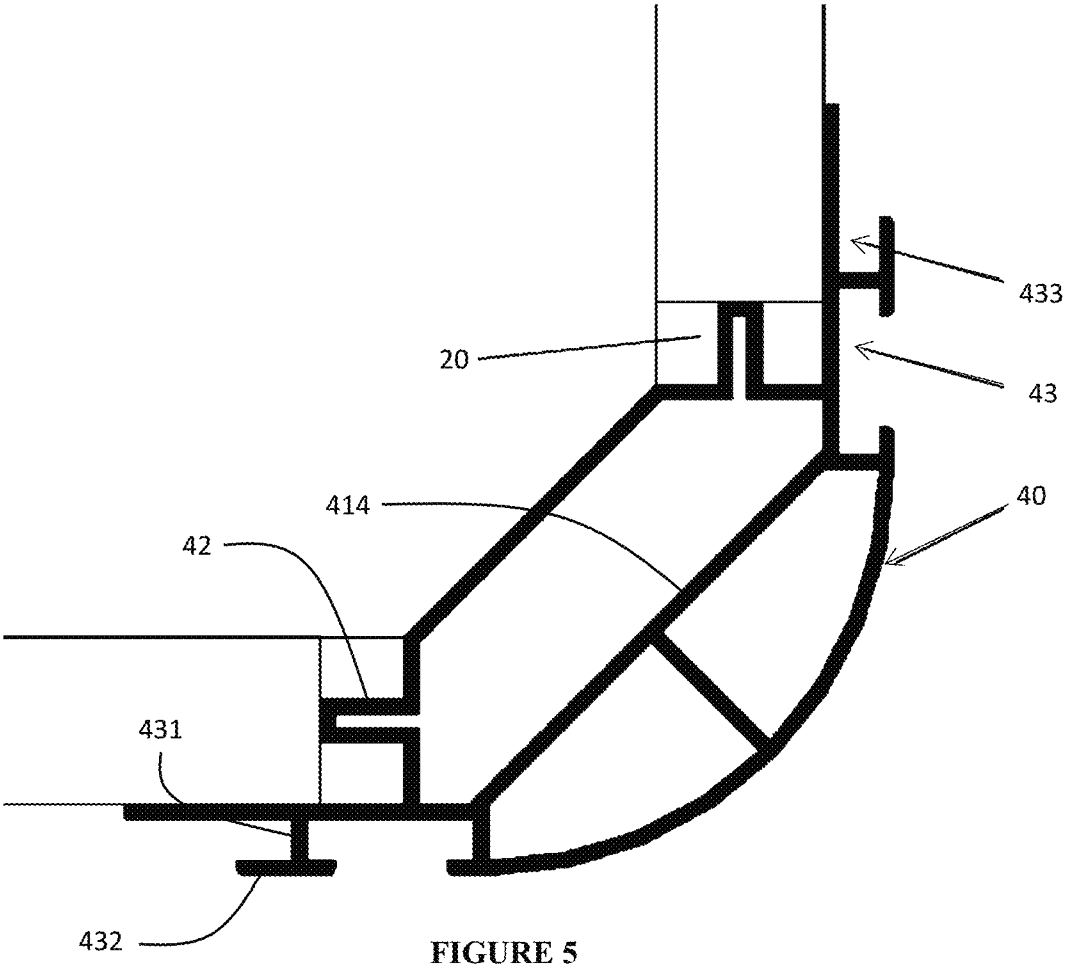
FIG. 5 is a top plan, cross sectional view (taken along a midline the bottom horizontal rail so as to bisect one of the corner brackets) of the fitment between the horizontal rails and the corner bracket, either as contemplated in FIG. 3A and FIG. 3B.

Whether in its compact or elongated form, the corner bracket 40 can also include an outer extension 43, as best seen in FIG. 5. This outer extension 43 protrudes away from the abutment facing 412, preferably at the same angle as the projections 421, 422. The extension 43 and serve as an alignment guide for the rails 20*a*, 20*b*. In some aspects, a projection 431 juts out from the outer facing of the extension 43 and terminates with a lateral retention flange 432. Flange 432 is spaced apart from the outer surface of the extension 43, preferably at a parallel orientation to it, so as to form a panel connection slot 433.

Slot 433 is configured to receive outer panels (not shown), that may be slid or flexed into place so as to form a decorative exterior that conceals the frame 12 and basin seated in it. As shown in FIG. 5, the projection 431 can also be spaced apart from outer facing 413 to define a vertical slot that could also accommodate wires or tubing. Alternatively, the projection 431 could merely continue out from the contour of the facing 413 itself. In either instance, the slot 433 has a width that matches the periphery of decorative panels so as to secure and hold them place.

Another style of corner bracket 40*a* is contemplated in FIGS. 7A-10C. Bracket 40*a* has many of the same features as bracket 40, with the further understanding that bracket 40*a* is specifically engineered to accommodate decorative concealing cap assembly 44. Thus, in addition to the housing 41, flanges 421, 422, and various facings 411, 412, 413 as described above, bracket 40*a* includes a ledge 45 that serves as a seat and a guide for the lower extremities of assembly 44. In some aspects, ledge 45 will abut an axial facing that has a radius that substantially matches the radius or curvature of the assembly 44, so as to conform the pieces along a common interface. A guide element 451 can also be provided to couple and/or abut interior components of the assembly 44.

Figure 7A:
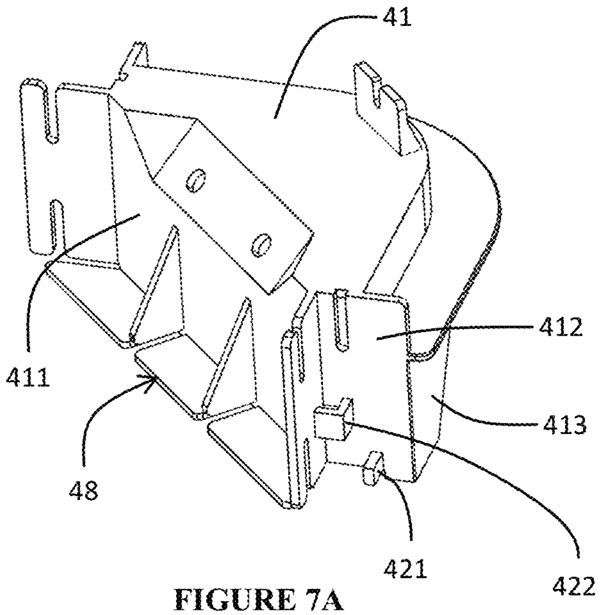
FIG. 7A is a perspective view of an alternative configuration of the corner bracket, with FIG. 7B showing an exploded perspective view of the fitment between the horizontal rails and that bracket.
Figure 7B:
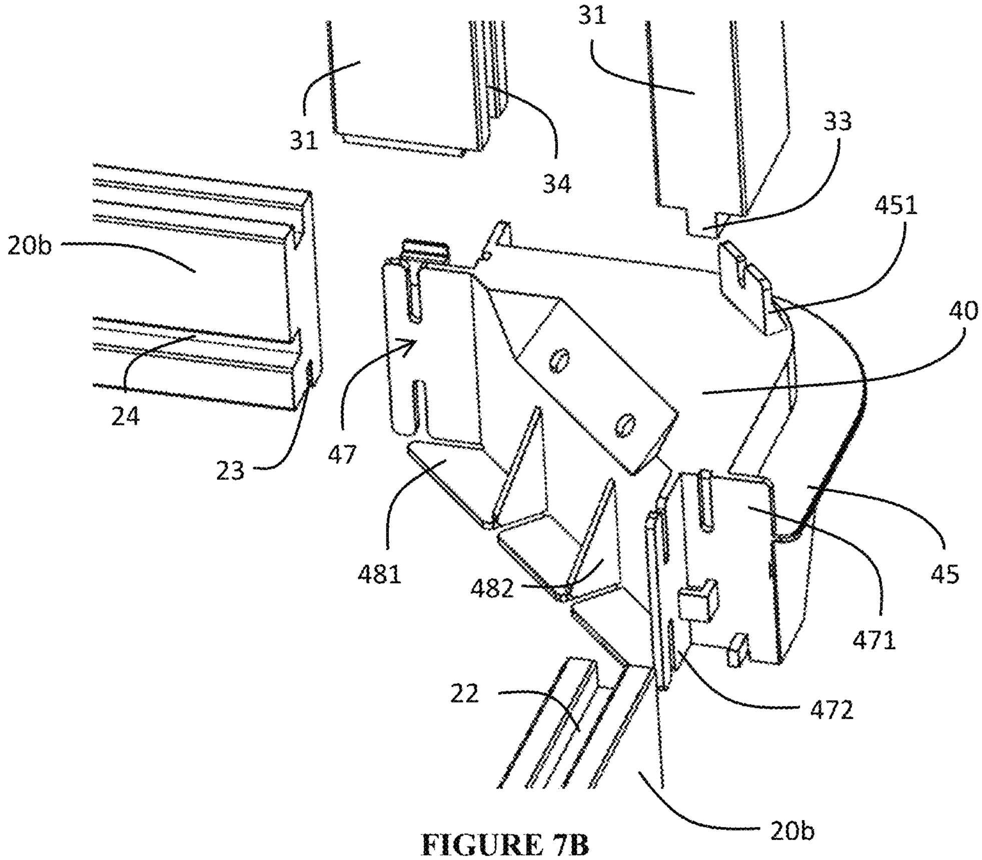
Figure 8A:
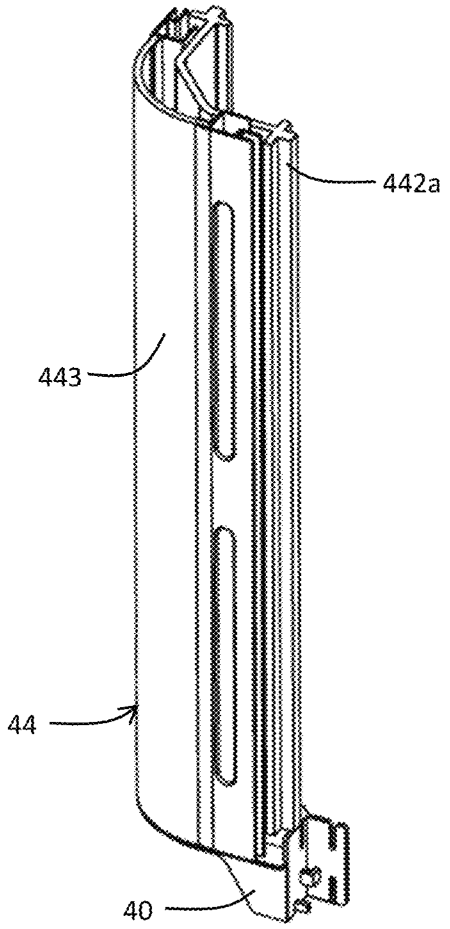
FIGS. 8A, 8B, and 8C are varying perspective views of the corner bracket of FIG. 7A fitted a concealing cap assembly that eliminates the need for an additional bracket at the top rail, with FIG. 8A showing an exterior surface (when the combination is included in a completed frame), FIG. 8B showing an interior facing, and FIG. 8C a top-down view so as to provide a better sense of the interconnections with the concealing cap assembly.
Figure 8B:
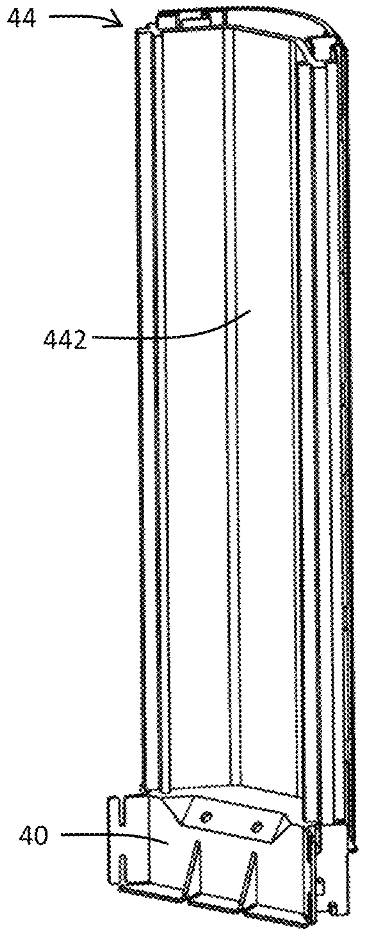
Figure 8C:
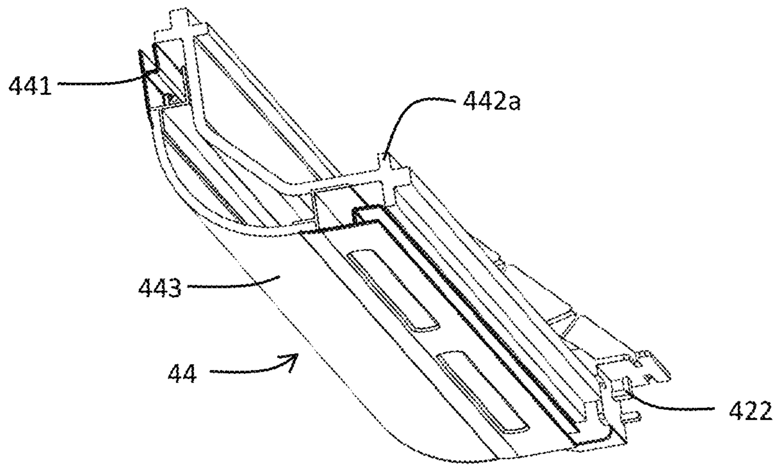

Bracket 40 or 40*a* can also include guide plates 47. Plates 47 also facilitate the alignment and connection of the rails 20, 30 and/or the assembly 44. As seen in FIG. 7B, plate 471 is formed orthogonally to plate 472, with flanges 42 extending away from the plate 471 for connection to the bottom rail 20*b* (within grooves 23, 24 as described above). In some aspects, flange 422 can formed integrally with both plates 471, 472 so as to better insure a squared fit with the rail 20*b*. Slots or apertures can be provided within the plates 47 to allow for the use of additional fasteners (e.g., nails, screws, etc.) to stabilize the connection of the parts even further. However, it will be understood that such fasteners are not necessarily required and, in fact, one of the advantages of system 10 is the ability to assemble the frame without relying upon screws or nails. Additional guide plates 47 can be formed on the bracket as appropriate to the anticipated configuration of the frame 12 and/or any decorative elements (e.g., panels, concealing cap, etc.).

Bracket 40 or 40*a* can also employ stabilizing flanges or fins 48. Fin 481 is aligned in the horizontal plane and can serve as a connection/support for other components (e.g., the floor panel, struts, etc.) or simply to allow for level seating of the frame 12 on the ground. Fin 482 has a vertical orientation that may also guide or couple to components and lend further structural support. Additional stabilizing flanges 48 can be provided anywhere around the periphery of the bracket, including along its curved outer facing 413.

Figure 6:
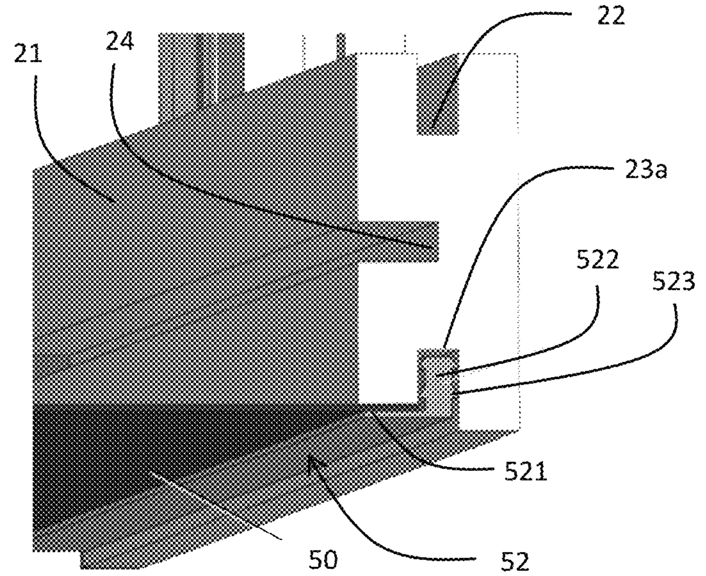
FIG. 6 is a cross sectional perspective view of the fitment between the bottom rail and the bottom panel along a plane that runs transverse to the bottom rail.

In FIG. 6, an alternative bottom rail 20*b* is depicted. Here, the bottom groove 23*a* has a different profile that is specifically selected to accommodate an L-shaped retainer 52. In particular, the surface along the inner facing of the groove 23*a* is offset in comparison to the outer facing, thereby providing sufficient height to accommodate the panel 50 and retainer 52. Notably, extension leg 521 is configured to capture the peripheral edge of the panel 50 between the leg 521 and the inner bottom facing of the rail 23*a*. A post 522 extends at an angle, preferably orthogonal, to the leg 521, while barbs 523 on the sides of the post 522 establish and improve the interference fit of the retainer 52 within the groove 23*a*. The retainer 52 may extend axially along all, substantially all, or intermittent portions of the groove 23*a* and modified bottom rail 20*b*. In this manner, the bottom panel(s) 50 is/are secured to the frame 12. With reference to FIGS. 7A and 7B, it should also be understood that the midline grooves of any of the rails can be moved off the centerline axis, so as to allow for quick identification and proper orientation of the alternative rail.

In another aspect, the keying projections 32, 33 and/or flanges 421, 422 can also be provided with one or a series of barbs like the ones shown on post 522 in FIG. 6. As above, this would establish and improve the interference fit to prevent sliding or dislodgement of the projections or flanges out of their respective grooves.

The concealing cap assembly 44 is shown in detail in FIGS. 8A-10C. Notably, use of assembly 44 can eliminate the need for brackets 40, 40*a* along the top edge of the frame 12 because of the use of cap bracket 442. Assembly 44 also has a modular construction, so as to allow for the incorporation of various different and decorative trim assembly 441. For example, exterior panel 441*a* can include attachment brackets to accommodate panel 53 along its lengthwise edges, while also providing cutouts to view decorative elements 441*b*. Backing member 441*c* can insure alignment against the cap bracket 442.

Figure 9A:
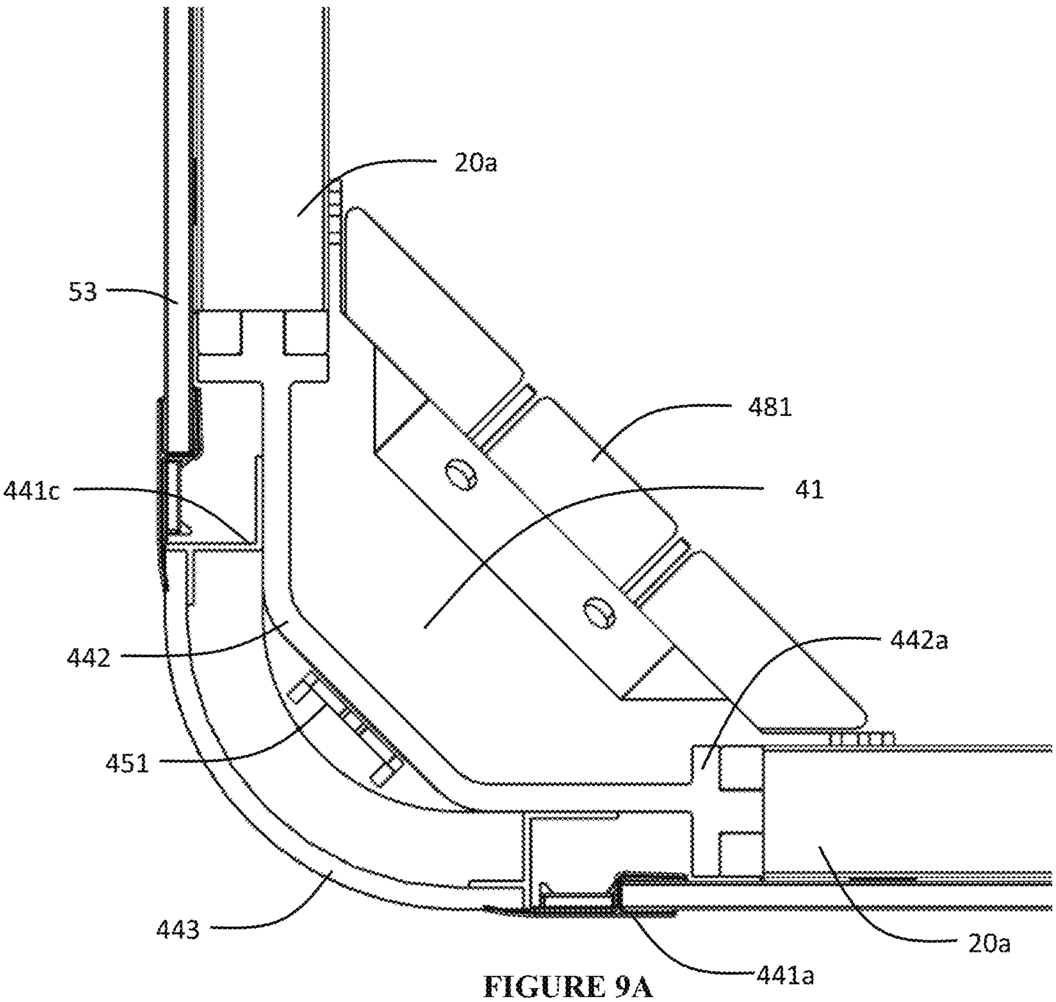
FIG. 9A is a top plan view of the fitment between the horizontal rails and the corner bracket and FIG. 9B is an isolated perspective view showing the vertical rails and their connection to the decorative concealing cap, either as contemplated in FIGS. 8A, 8B, and 8C.
Figure 9B:
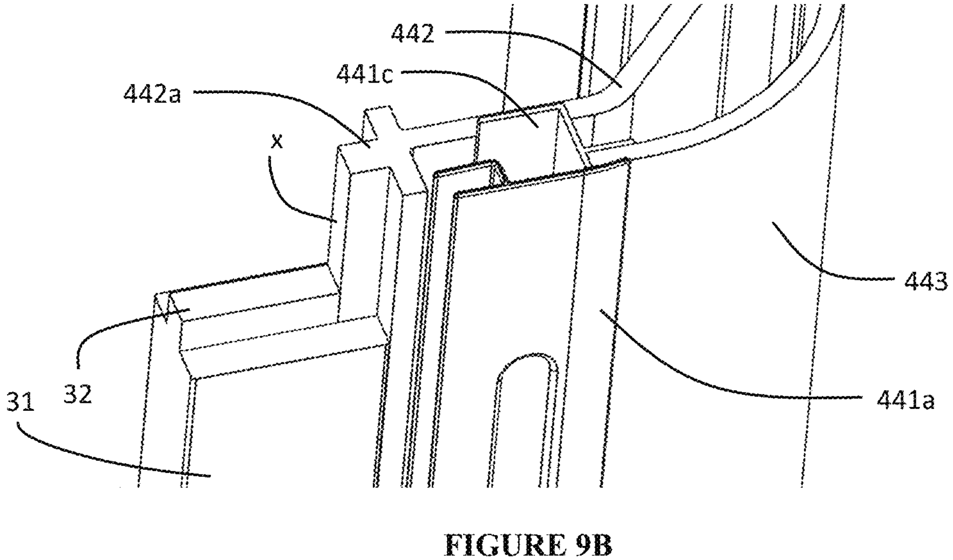
Figure 10A:
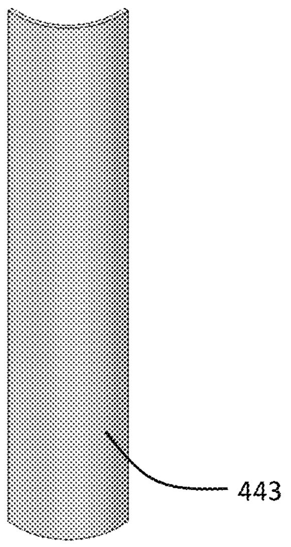
FIGS. 10A, 10B, and 10C are perspective views of the edge piece, the cap bracket, and the trim assembly, respectively speaking, in isolation and all of which form the concealing cap of FIGS. 9A and 9B, with FIG. 10C including an inset image showing the various individual elements of the trim assembly in an exploded view/orientation.
Figure 10B:
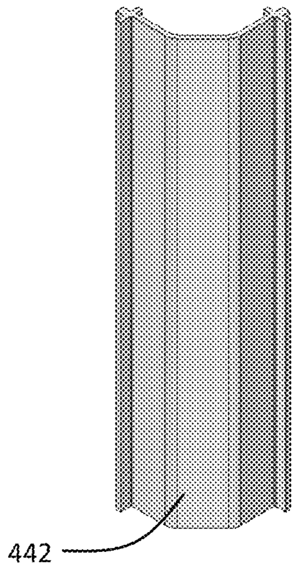
Figure 10C:
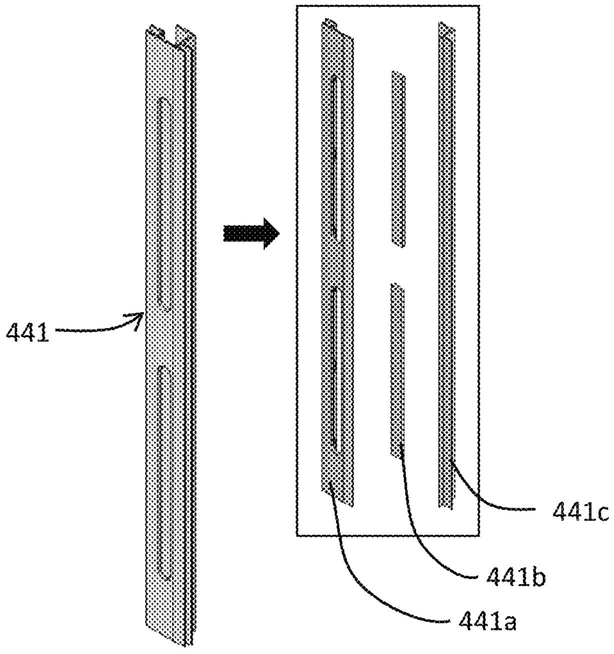

Cap bracket 442 conforms to the same basic horizontally cross sectional shape as the bracket 40*a* (as seen in FIG. 9, an L- or C-shaped right angle). Cap bracket 442 includes one or more axial or lengthwise coupling flanges 442*a* on its terminal ends. Flanges 442*a* may couple to the groove 34 on the vertical rail 31. In some aspects, a plurality of flanges 442*a* form a T-shape to facilitate alignment with the rail 31. The main body of cap bracket 442 spanning the space between the opposing flanges 442*a* can have rigid and thin construction to impart structural strength while minimizing material usage. The thinned wall sections in this main body create hollow interior channels within the assembly 44, in which components, lights, wiring, or decorative elements can be housed or affixed.

Edge piece 443 can be a curved decorative element seated on the bracket 40, 40*a* and further retained in place by the trim assembly 441. Edge piece 443 can be snap-fitted or otherwise coupled to the frame 12 in a manner that allows for comparatively easy removal so as to allow access to the aforementioned hollow interior channels.

One of the advantages of the foregoing frame systems 12 is that they may be constructed from synthetic and/or composite materials (e.g., rigid polymers, cellulose fiber composites, cement board composites, polymer-composite hybrids, etc.). Such materials may be extruded, pressed, or molded into their desired shaped, which stands in contrast to conventional lumber that is normally cut and/or worked into its final, desired shape. Further, synthetic and/or composite materials tend to be more resistant to damage caused by ambient conditions, such as moisture, insect intrusion, dry rot, etc.

The foregoing systems are also advantageous because they can be assembled relying solely upon the interference fits between the keying projections, grooves, etc. This arrangement minimizes or eliminates the need for separate fasteners (along with the power tools typically needed to install such fasteners). Further, the configuration of the brackets 40, 40*a*—especially when imparted with guide plates 47—facilitates proper alignment of components in level/“true” position (i.e., parallel to the horizon).

All components of the system should be made of materials having sufficient flexibility and structural integrity, as well as being chemically inert and/or corrosion-resistant. Low-cost, injection-moldable or extrudable plastics, including polymers and copolymers such as various grades of polypropylene, acrylonitrile butadiene styrene, polyethylene, polycarbonate, acrylics, and polyvinyl chloride, polystyrene are particularly useful, although metals, alloys, and/or composites could also be used. Anti-microbials, UV- and/or impact-resistant materials, colorants, and other common additives, materials, and/or coatings could be employed to further enhance aspects of the invention.

Any reference to coupling or attachment in this disclosure are to be understood as encompassing any of the conventional means used in this field, and coupled elements will generally move as a single unit. This may take the form of snap- or force fitting of components, although threaded connections, bead-and-groove, and bayonet-style/slot-and-flange assemblies could be employed, with the keyed projections shown in selected figures being akin to bayonet-style couplings. Adhesive and fasteners could also be used in addition to or in place of interference fit connections, although such components must be judiciously selected so as to meet the aims of this invention.

In some instances, engagement may involve coupling or an abutting relationship, with the latter meaning that the abutting components are not necessarily attached and, therefore, need not move as a single unit. These terms, as well as any implicit or explicit reference to coupling, will should be considered in the context in which it is used, and any perceived ambiguity can potentially be resolved by referring to the drawings.

Although the present embodiments have been illustrated in the accompanying drawings and described in the foregoing detailed description, it is to be understood that the invention is not to be limited to just the embodiments disclosed, and numerous rearrangements, modifications and substitutions are also contemplated. The exemplary embodiment has been described with reference to the preferred embodiments, but further modifications and alterations encompass the preceding detailed description. These modifications and alterations also fall within the scope of the appended claims or the equivalents thereof.

We claim:

1. A system for constructing a structural support frame for a fluid containment vessel, the system comprising:

at least one support rail formed as elongate body having top, bottom, and inner facings and with an identical groove formed along a full length of each of the top and bottom facings and midline groove formed along a full length of the inner facing;

a plurality of vertical supports, each vertical support formed from an elongate body having keying projections provided at opposing axially aligned edges of each elongate body;

a plurality of corner brackets, each corner bracket having a housing with a first and second abutment facings each aligned within different, non-parallel vertical planes and with a first and second connecting flange extending away from each of the first and second abutment facings; and wherein each first connecting flange is configured to couple with the midline groove, each second connecting flange is configured to couple with the identical groove in either the top or bottom facing, and each keying projection is configured to couple with the identical groove in either the top or bottom facing.

2. The system of claim 1 wherein each keying projection has an identical profile and depth.

3. The system of claim 1 wherein the identical grooves in both the top and bottom facings and the midline groove all have an identical profile and depth.

4. The system of claim 1 wherein the corner bracket includes an outer extension forming an exterior panel connection slot.

5. The system of claim 1 further comprising a retention member and a bottom panel and wherein the retention member couples to the identical groove in the bottom facing so as to secure the bottom panel in place when the system is constructed into the structural support frame.

6. The system of claim 1 wherein a plurality of support rails of the at least one support rails are provided and wherein, when the system is constructed into the structural support frame, a first support rail is coupled to the first abutment facing and a second support rail is coupled to the second abutment facing of a single corner bracket.

7. The system of claim 6 further comprising at least one top rail formed as elongate body having a bottom with an identical groove formed along a full length of a bottom facing and wherein, when the system is constructed into the structural support frame, each top rail is positioned parallel to each support rail with the plurality of vertical supports positioned between the bottom facing of the at least one top horizontal rail and the top facing of the at least one support rail.

8. The system of claim 7 wherein one of the support rails is a bottom support rail and, at least one corner bracket of the plurality of corner brackets is formed with an elongate housing extending from the bottom support rail to the top rail.

9. The system of claim 1 wherein the midline groove is offset from a central axis along the full length of the inner facing.

10. The system of claim 1 further comprising a concealing cap assembly coupled along an outer facing of at least one of the plurality of corner brackets.

11. The system of claim 10 wherein the concealing cap assembly includes at least one of: an edge piece, a cap bracket, and a trim assembly.

12. The system of claim 1 wherein at least one of the corner brackets includes at least one of: an guide plate, a radial ledge, and a stabilizing flange.

13. A frame for a fluid containment vessel, the frame comprising:

at least four top rails, each formed as an elongate body having a bottom with an identical groove formed along a full length of a bottom facing;

at least four bottom support rails, each formed as an elongate body having top, bottom, and inner facings and with an identical groove formed along a full length of each of the top and bottom facings and midline groove formed along a full length of the inner facing;

at least four vertical supports, each vertical support formed from an elongate body having keying projections provided at opposing axially aligned edges of each elongate body;

at least four corner brackets, each corner bracket having a housing with a first and second abutment facings each aligned within different, non-parallel vertical planes and with a first and second connecting flange extending away from each of the first and second abutment facings;

wherein the first connecting flange on the first and second abutment facings of every corner bracket are coupled to the midline groove on two separate support rails and the second connecting flange on the first and second abutment facings of every corner bracket are coupled to the identical groove in either the top or bottom facing on two separate support rails; and wherein each top rail is positioned parallel to each support rail at least one vertical support positioned therebetween so that the identical groove in the bottom facing of each top horizontal rail and the identical groove in the top facing of each support rail each receive the axially opposed keying projections of each vertical support.

14. The frame of claim 13 wherein each elongate body of the vertical supports is identically formed as a rod with a rectangular profile.

15. The frame of claim 13 wherein each elongate body of the bottom support rails is identically formed as a rod with a rectangular profile.

16. The frame of claim 13 wherein each elongate body of the top rails is identically formed as a rod with a rectangular profile.

17. The frame of claim 13 further comprising a concealing cap assembly seated on at least one of the corner cap brackets.

18. The frame of claim 13 further comprising at least one decorative panel coupled to adjoining corner brackets and configured to conceal the top rails and the bottom support rails positioned between the adjoining corner brackets.

* * * * *